(No Model.)
M. F. CONNETT.
CHECK ROW ATTACHMENT FOR CORN PLANTERS.
No. 296,533. Patented Apr. 8, 1884.
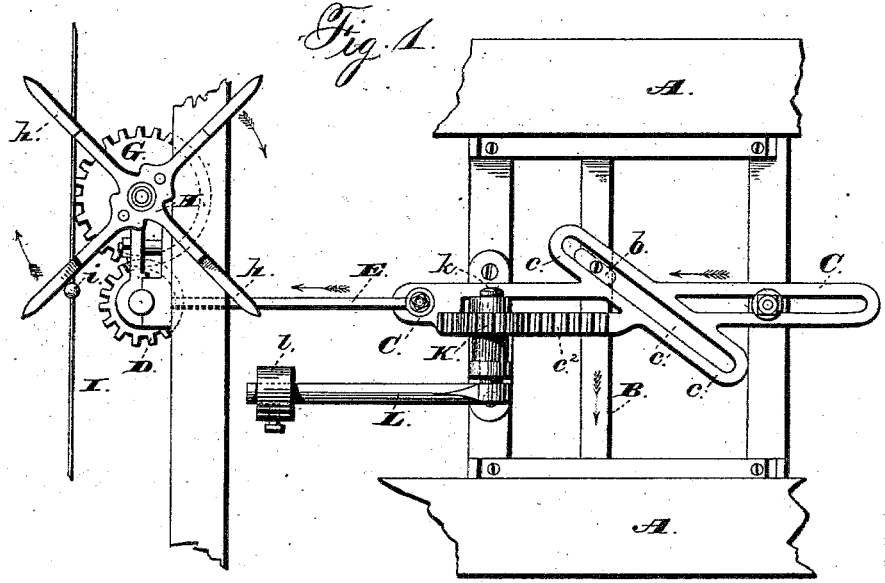
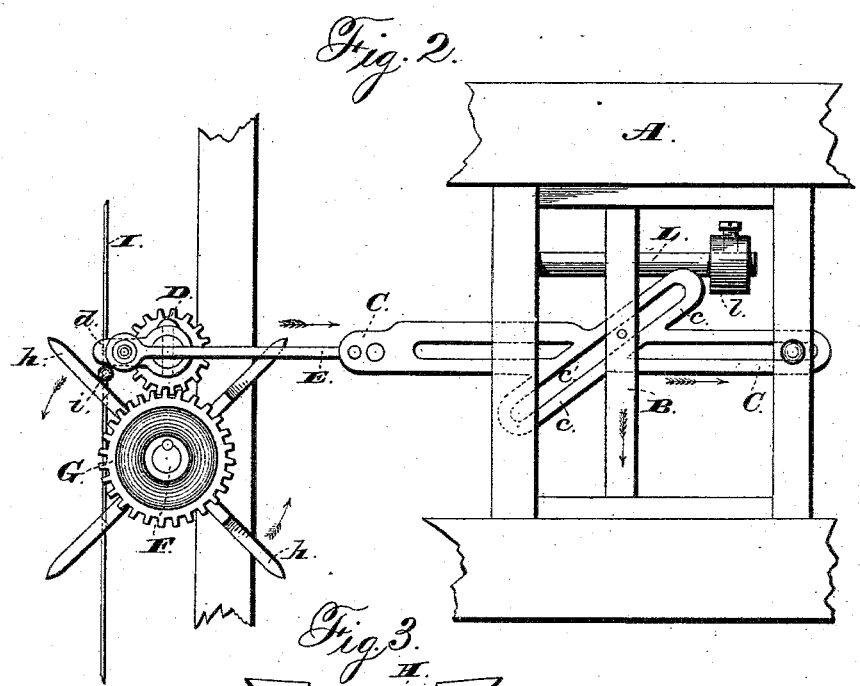
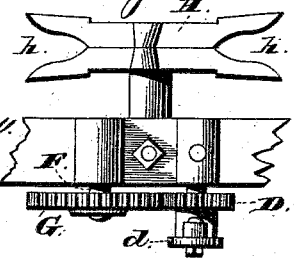
Witnesses:
Jas. E. Hutchinson
Henry C. Hazard
Inventor:
M. F. Connett, by
Pindell & Russell, his
attorneys

UNITED STATES PATENT OFFICE.

MATTHEW FRANKLIN CONNETT, OF SPRINGFIELD, ILLINOIS.

CHECK-ROW ATTACHMENT FOR CORN-PLANTERS.

SPECIFICATION forming part of Letters Patent No. 296,533, dated April 8, 1884.

Application filed November 21, 1883. (No model.)

*To all whom it may concern:*

Be it known that I, MATTHEW F. CONNETT, of Springfield, in the county of Sangamon, and in the State of Illinois, have invented certain new and useful Improvements in Check-Row Attachments for Corn-Planters; and I do hereby declare that the following is a full, clear, and exact description thereof, reference being had to the accompanying drawings, making a part of this specification, in which—

Figure 1 is a plan view of my attachment from the upper side. Fig. 2 is a like view of the lower side of the same, and Fig. 3 is a front elevation of said mechanism.

Letters of like name and kind refer to like parts in each of the figures.

The design of my invention is to simplify the construction and to increase the efficiency and certainty of action of check-row attachments for corn-planters; and to this end said invention consists, principally, in a check-row attachment for corn-planters in which are combined the following elements, viz: a chain or sprocket wheel adapted to be rotated intermittingly in one direction by the action of a knotted check-row line, a longitudinally-reciprocable bar arranged at a right angle to the seed-slide, and provided with a diagonal cam-slot which engages with a stud or pin upon the latter, and means, substantially as shown, for connecting said sprocket-wheel and slotted bar, whereby each partial rotation of the former will cause the latter to be moved longitudinally and said seed-slide to be operated, substantially as and for the purpose hereinafter specified.

It consists, further, in the combination of a longitudinally-reciprocable bar provided with a diagonal slot and arranged at a right angle to the line of movement of the seed-slide, a stud or pin secured to the latter and engaging with said diagonal groove, and means, substantially as described, whereby said slotted bar may be caused to reciprocate, substantially as and for the purpose hereinafter shown.

It consists, further, in the means employed for moving the seed-slide-actuating mechanism to the limit of its motion in each direction, and for holding said mechanism in such position, substantially as and for the purpose hereinafter set forth.

It consists, finally, in the construction and combination of parts of the seed-slide-actuating mechanism, substantially as and for the purpose hereinafter shown and described.

In the annexed drawings, A and A represent two seed-boxes, and B a seed-slide which extends between and into the same, and has any usual construction that will enable said slide, by a longitudinally-reciprocating motion, to drop from said boxes predetermined quantities of corn or other kinds of grain placed therein.

Extending across the upper side of the seed-slide B is a bar, C, which is suitably supported and is confined in lateral position, while free to move longitudinally in each direction within certain limits. At or near its longitudinal center said bar is provided at each side with an extension, $c$, that is oblique to the longitudinal axis, and in connection with the opposite extension, $c$, furnishes means for the formation of a slot, $c'$, that extends diagonally across said bar, and to equal distances at each side of the same.

Secured to the upper side of the seed-slide B is a stud, $b$, which extends upward into the groove $c'$, and loosely fills the same transversely. Said stud is preferably elongated lengthwise of said slot, but may be round, if desired, or may have journaled thereon a friction-roller. As thus arranged, it will be seen that if the bar C is moved lengthwise in either direction the diagonal slot $c'$, operating upon the stud $b$, will cause the seed-slide B to be moved longitudinally, and that by giving to said slotted bar the necessary limits of motion and properly timing its reciprocations seed will be dropped at regular intervals from the machine.

The slotted bar C is operated by means of the following mechanism, viz: Journaled at a suitable point in front of said bar C is a pinion, D, which has secured to its lower side a radial arm, $d$, to which is pivoted one end of a rod, E, the other end of which is pivoted upon or near the front end of said bar. At one side of said pinion D is journaled a short vertical shaft, F, which has secured to its lower end a gear-wheel, G, that meshes with said pinion, while upon the upper end of the shaft is secured a sprocket-wheel, H, that has preferably four arms, $h$. The distance from the center of rotation of the pinion D at which the rod E is pivoted equals one-half of the desired longitudinal movement of the slotted bar C, so that by a one-half revolution of said pinion said bar may be moved to the limit of its motion in one direction, while by the completion of the revolution of said pinion said slotted bar will be moved to the limit of its motion in the opposite direction. The gear-wheel G has just twice the diameter of the pinion D where the sprocket-wheel H has four radial arms, $h$, so that a one-fourth rotation of said sprocket-wheel will cause a complete movement of the slotted bar C in one direction. Should the number of said arms $h$ be increased or diminished, the relative proportions of said pinion and gear-wheel must be correspondingly varied, the object being to produce a single movement of the seed-slide for each of said radial arms. In use a line, I, provided at suitable predetermined intervals with knots $i$, is employed by causing it to extend from one side of the field to and around a guide-pulley that is attached to one side of the machine, from thence across said machine, adjacent to the sprocket-wheel H, to and around the opposite guide, and from thence to the opposite side of said field, in the usual manner.

In passing across the machine the line I passes through the forked ends of two of the arms $h$ of the sprocket-wheel H, and by the motion of said machine is caused to move longitudinally through the same. Said line passes freely through said arms until one of the knots $i$ comes into contact with the arm in advance, when it engages therewith and rotates said wheel one-fourth of a revolution, by which time the forward inclination of said arm causes said knot to become disengaged, and further movement of said wheel ceases until the operation described is repeated by the engagement of another knot with the next succeeding arm $h$.

In order that the seed-slide may with certainty be moved to the limit of its motion in each direction, and may be prevented from being moved from such position by the jolting of the machine, the following means are employed, viz: Upon the upper face of the slotted bar C is formed a toothed rack, $c^2$, which engages with a pinion, K, that is secured upon one end of a shaft, $k$, which is journaled above and at a right angle to said bar. Upon the opposite end of said shaft is secured a radial arm, L, that is provided with a weight, $l$, which may be adjusted lengthwise of and secured in position upon the same. The diameter of the pinion K is such that a complete single movement of the slotted bar C in either direction will cause the weighted arm L to pass from a nearly horizontal position in one direction to a corresponding position in the opposite direction. As said arm passes forward of the center, it operates to move said slotted bar, instead of being moved by the same, and forces said bar with a shock to the limit of its motion, such operation rendering certain the completion of the stroke, and by the shock aiding the seed-dropping mechanism to perform its work with certainty.

Having thus fully set forth the nature and merits of my invention, what I claim as new is—

1. A check-row attachment for corn-planters in which are combined the following elements, viz: a chain or sprocket wheel adapted to be rotated intermittingly in one direction by the action of a knotted check-row line, a longitudinally-reciprocable bar arranged at a right angle to the seed-slide, and provided with a diagonal cam-slot, which engages with a stud or pin upon the latter, and means, substantially as shown, for connecting said sprocket-wheel and slotted bar, whereby each partial rotation of the former will cause the latter to be moved longitudinally and said seed-slide to be operated, substantially as and for the purpose specified.

2. The combination of a longitudinally-reciprocable bar provided with a diagonal slot and arranged at a right angle to the line of movement of the seed-slide, a stud or pin secured to the latter and engaging with said diagonal groove, a pitman-rod connected with the bar and driven from a crank or pitman wheel, and suitable means for driving said wheel, substantially as shown and described.

3. In combination with the slotted seed-slide-actuating bar C, provided with the toothed rack $c^2$, the pinion K, shaft $k$, and radial weighted arm L, substantially as and for the purpose set forth.

4. In combination with the seed-slide B, provided with the stud $b$, the bar C, having the diagonal slot $c'$, the pinion D, provided with the arm $d$, the connecting-rod E, the shaft F, the gear-wheel G, the sprocket-wheel H, having the arms $h$, and the line I, provided with the knots $i$, all constructed and operating substantially as and for the purpose shown and described.

In testimony that I claim the foregoing I have hereunto set my hand this 30th day of October, 1883.

MATTHEW FRANKLIN CONNETT.

Witnesses:
 I. K. BRADLEY,
 WM. D. CARPENTER.